US007739530B2

(12) United States Patent
Takayama et al.

(10) Patent No.: US 7,739,530 B2
(45) Date of Patent: Jun. 15, 2010

(54) METHOD AND PROGRAM FOR GENERATING EXECUTION CODE FOR PERFORMING PARALLEL PROCESSING

(75) Inventors: Koichi Takayama, Saitama (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 790 days.

(21) Appl. No.: 11/707,146

(22) Filed: Feb. 16, 2007

(65) Prior Publication Data
US 2008/0034236 A1   Feb. 7, 2008

(30) Foreign Application Priority Data
Aug. 4, 2006   (JP)   ............... 2006-213342

(51) Int. Cl.
*G06F 1/26* (2006.01)
*G06F 1/22* (2006.01)

(52) U.S. Cl. .................. 713/320; 713/300; 713/322; 717/119; 717/131; 717/135; 717/150; 717/151

(58) Field of Classification Search .............. 713/300, 713/320; 717/119, 131, 135, 150, 151
See application file for complete search history.

(56) References Cited

U.S. PATENT DOCUMENTS

| 6,795,781 | B2 * | 9/2004 | Aldridge et al. ............ 702/60 |
| 7,185,215 | B2 * | 2/2007 | Cook et al. ............... 713/320 |
| 7,334,143 | B2 * | 2/2008 | Atkinson .................. 713/320 |
| 7,526,637 | B2 * | 4/2009 | Jung et al. ................ 712/241 |
| 2003/0014742 | A1 * | 1/2003 | Seth et al. ............... 717/158 |
| 2004/0168097 | A1 * | 8/2004 | Cook et al. ............... 713/320 |
| 2005/0235170 | A1 * | 10/2005 | Atkinson .................. 713/320 |
| 2006/0253715 | A1 * | 11/2006 | Ghiasi et al. .............. 713/300 |
| 2007/0130568 | A1 * | 6/2007 | Jung et al. ................ 718/104 |
| 2008/0059823 | A1 * | 3/2008 | Balatsos et al. ........... 713/323 |
| 2008/0189562 | A1 * | 8/2008 | McBrearty et al. ......... 713/300 |
| 2008/0235364 | A1 * | 9/2008 | Gorbatov et al. .......... 709/224 |
| 2009/0171646 | A1 * | 7/2009 | Silbermintz et al. ........ 703/16 |

FOREIGN PATENT DOCUMENTS

JP   2003-44289   7/2001

* cited by examiner

*Primary Examiner*—Thomas Lee
*Assistant Examiner*—Jaweed A Abbaszadeh
(74) *Attorney, Agent, or Firm*—Stites & Harbison, PLLC; Juan Carlos A. Marquez, Esq.

(57) ABSTRACT

Provided is a method of reliably reducing power consumption of a computer, while promoting prompt compilation of a source code and execution of an output code. The method according to this invention includes the steps of: reading a code which is preset and analyzing an amount of operation of the CPU and an access amount with respect to the cache memory based on the code; obtaining an execution rate of the CPU and an access rate with respect to the cache memory based on the amount of operation and the access amount; determining an area in which the access rate with respect to the cache memory is higher than the execution rate of the CPU, based on the code; adding a code for enabling the power consumption reduction function to the area; and generating an execution code executable on the computer, based on the code.

18 Claims, 13 Drawing Sheets

430 ⟶

| No. | ITEM | CONTENTS | |
|---|---|---|---|
| 1 | DATA TYPE (NAME OF VARIABLE) | xx, yy | |
| 2 | DATA CHARACTERISTICS | (CONTINUOUS) | STRIDE (STRIDE INTERVAL) |
| 3 | CITATION INTERVAL OF DATA | (B1+B2+B3+B4) * jj * kk * n/p | |
| 4 | INTERVAL CONTROL VARIABLE | jj, ii, n/p | |
| 5 | FREQUENCY OF RECYCLING | (ONE TIME, TWO VARIABLES)  TIMES | |
| 6 | AMOUNT OF OTHER DATA UNTIL THE RECYCLE | (B3+B4)* jj* kk* n/p  MB | |
| 7 | AMOUNT OF OTHER DATA (DEPENDENT ON VARIABLE) | B1+B2+B3, B1+B2+B4 | |
| 8 | OPERATION AMOUNT | 2* jj *kk* n/p+3* jj*kk* n/p | |

SAMPLE PROGRAM

```
do i=1, n/p
do j=1, jj
do k=1, kk
  xx(k,j,i)= yy(k,j,i)
    + zz(k,j,i)* aa
enddo
enddo
enddo
do i=2, n/p
do j=1, jj
do k=1, kk
  bb(k,j,i)=bb( k, j ,i-2 )
    +xx(k,j,i)+ yy(k,j,i)
enddo
enddo
enddo
```

M : CAPACITY OF MEMORY (Byte)
B1: NUMBER OF BYTES OF ONE PARAMETER OF VARIABLE xx (Byte)
B2: NUMBER OF BYTES OF ONE PARAMETER OF VARIABLE yy (Byte)
B3: NUMBER OF BYTES OF ONE PARAMETER OF VARIABLE zz (Byte)
B4: NUMBER OF BYTES OF ONE PARAMETER OF VARIABLE bb (Byte)
n : LOOP INDEX
p : NUMBER OF PARALLELS

IF (n/p*3*B > M) POWER_CONTROL (A1)

| 310-1 | 310-2 | 310-3 | 310-P |
|---|---|---|---|
| do i=1, n/p<br>x(i)=y(i)+z(i)*a<br>enddo<br>do i=2, n/p<br>y(i)=x(i-1)+z(i)*b<br>enddo | do i=n/p+1, 2*n/p<br>x(i)=y(i)+z(i)*a<br>enddo<br>do i=n/p+1, 2*n/p<br>y(i)=x(i-1)+z(i)*b<br>enddo | do i=2*n/p+1, 3*n/p<br>x(i)=y(i)+z(i)*a<br>enddo<br>do i=2*n/p+1, 3*n/p<br>y(i)=x(i-1)+z(i)*b<br>enddo | do i=(p-1)*n/p, n<br>x(i)=y(i)+z(i)*a<br>enddo<br>do i=(p-1)*n/p, n<br>y(i)=x(i-1)+z(i)*b<br>enddo |

IF(n/p*3*B > M) POWER_CONTROL (A2)

IF(n/p*12*B > M) POWER_CONTROL (A1)

| 310-1 | 310-2 | 310-3 | 310-P |
|---|---|---|---|
| do i=1, n/p<br>x(i)=y(i)+z(i)*a<br>a(i)=b(i)*c(i)+d<br>e(i)=f(i)+g(i)<br>+h(i)+r(i)<br>s(i)=t(i)*u(i)+v(i)<br>enddo<br>do i=2, n/p<br>y(i)=x(i-1)+z(i)*b<br>enddo | do i=n/p+1, 2*n/p<br>x(i)=y(i)+z(i)*a<br>a(i)=b(i)*c(i)+d<br>e(i)=f(i)+g(i)<br>+h(i)+r(i)<br>s(i)=t(i)*u(i)+v(i)<br>enddo<br>do i=n/p+1, 2*n/p<br>y(i)=x(i-1)+z(i)*b<br>enddo | do i=2*n/p+1, 3*n/p<br>x(i)=y(i)+z(i)*a<br>a(i)=b(i)*c(i)+d<br>e(i)=f(i)+g(i)<br>+h(i)+r(i)<br>s(i)=t(i)*u(i)+v(i)<br>enddo<br>do i=2*n/p+1, 3*n/p<br>y(i)=x(i-1)+z(i)*b<br>enddo | do i=(p-1)*n/p, n<br>x(i)=y(i)+z(i)*a<br>a(i)=b(i)*c(i)+d<br>e(i)=f(i)+g(i)<br>+h(i)+r(i)<br>s(i)=t(i)*u(i)+v(i)<br>enddo<br>do i=2, n/p<br>y(i)=x(i-1)+z(i)*b<br>enddo |

IF(n/p*12*B > M) POWER_CONTROL (A2)

IF(n/p*jj*kk*3*B > M) POWER_CONTROL (A1)

| 310-1 | 310-2 | 310-3 | 310-P |
|---|---|---|---|
| do i=1, n/p<br>do j=1, jj<br>do k=1, kk<br>xx(k,j,i)= yy(k,j,i)<br>+zz(k,j,i)* aa<br>enddo<br>enddo<br>enddo<br>do i=2, n/p<br>do j=1, jj<br>do k=1, kk<br>bb(k,j,i)=bb(k,j,i-2)<br>+xx(k,j,i)+ yy(k,j,i)<br>enddo<br>enddo<br>enddo | do i=n/p+1, 2*n/p<br>do j=1, jj<br>do k=1, kk<br>xx(k,j,i)= yy(k,j,i)<br>+zz(k,j,i)* aa<br>enddo<br>enddo<br>enddo<br>do i=n/p+1, 2*n/p<br>do j=1, jj<br>do k=1, kk<br>bb(k,j,i)=bb(k,j,i-2)<br>+xx(k,j,i)+ yy(k,j,i)<br>enddo<br>enddo<br>enddo | do i=2*n/p+1, 3*n/p<br>do j=1, jj<br>do k=1, kk<br>xx(k,j,i)= yy(k,j,i)<br>+zz(k,j,i)* aa<br>enddo<br>enddo<br>enddo<br>do i=2*n/p+1, 3*n/p<br>do j=1, jj<br>do k=1, kk<br>bb(k,j,i)=bb(k,j,i-2)<br>+xx(k,j,i)+ yy(k,j,i)<br>enddo<br>enddo<br>enddo | do i=(p-1)*n/p, n<br>do j=1, jj<br>do k=1, kk<br>xx(k,j,i)= yy(k,j,i)<br>+zz(k,j,i)* aa<br>enddo<br>enddo<br>enddo<br>do i=(p-1)*n/p, n<br>do j=1, jj<br>do k=1, kk<br>bb(k,j,i)=bb(k,j,i-2)<br>+xx(k,j,i)+ yy(k,j,i)<br>enddo<br>enddo<br>enddo |

IF(n/p*jj*kk*3*B > M) POWER_CONTROL (A2)

M : MEMORY CAPACITY (Byte)
B : NUMBER OF BYTES IN VARIABLE (Byte)
n : LOOP INDEX
p : NUMBER OF PARALLELS
A1 : FREQUENCY REDUCTION INDEX
A2 : FREQUENCY RETURN INDEX

*FIG. 11*

METHOD AND PROGRAM FOR GENERATING EXECUTION CODE FOR PERFORMING PARALLEL PROCESSING

CLAIM OF PRIORITY

The present application claims priority from Japanese application P2006-213342 filed on Aug. 4, 2006, the content of which is hereby incorporated by reference into this application.

BACKGROUND OF THE INVENTION

This invention relates to a technique for efficiently operating a plurality of CPUs, in particular, a compiler which generates a program for performing a parallel processing.

In recent years, along with microfabrication of a semiconductor device due to the advancement of a semiconductor manufacturing technology, it has become possible to integrate an enormous number of transistors. The advancement of the semiconductor manufacturing technology has also raised the clock frequency at which a CPU (processor) operates. However, power consumption of the CPU and power consumption during standby due to leakage currents have also been increased. Therefore, studies have been made to improve a processing capability of a CPU with a minimum consumption of power.

In particular, in a case of, for example, a large-scale parallel computer in which several tens and hundreds of CPUs are used to perform a parallel processing, a considerable amount of electric power is required. In addition, it is also necessary to deal with a large amount of heat radiated from the computers, the heat being equivalent to the electric power.

In order to reduce the power consumption of a CPU, a CPU having a power saving mechanism (power consumption reduction function) capable of dynamically varying a clock frequency and an operating voltage of the CPU is becoming popular. According to a CPU of this type, the clock frequency and the operating voltage are shifted to a minimum value during idle time, while the clock frequency and the operating voltage are shifted to a maximum value only at a heavy load. There has also been known another CPU in which the clock frequency and the operating voltage are shifted in stages according to load conditions. The shifting of the clock frequency and the operating voltage can be controlled based on a predetermined command issued with respect to the CPU from an OS or from an application through an OS.

As regards a program executed on a computer including a CPU having the above-mentioned power saving mechanism, there has been known a technique of embedding a code for functioning the power saving mechanism into an execution code obtained through compilation in which a source code is converted into the execution code (see, for example, JP 2003-44289 A).

According to the technique, first, a user program (source code) to which a parameter has been preset is inputted into a compiler, and the compiler outputs a provisional code (assembler). Next, the provisional code is executed and the execution state is stored as a profile.

Then, the user program is compiled with reference to the profile obtained by the execution of the provisional code, to thereby generate an output code as intended. The compiler refers to the profile so that the compiler can generate an optimal output code (load module) with consideration given to heat to be radiated from the CPU, based on the use state of the resource of the computer.

SUMMARY OF THE INVENTION

However, according to the conventional example described above, a provisional code obtained by compiling a source code once is executed to obtain a profile during the execution, and the profile is used in second compilation for performing optimization to reduce power consumption, to thereby generate an output code. Accordingly, it is necessary to perform the same operation twice, namely, the operation for executing the provisional code so as to obtain the profile and the operation for executing the output code so as to obtain the result of the operation, to thereby achieve the original purpose. Therefore, it takes a great time before executing the intended output code, thereby leading to a problem in that the output code cannot be speedily executed after the input of the source code.

Also, in the operation for executing the provisional code, the operation similar to the operation for executing the output code is performed in order to obtain a profile for reducing power consumption, which leads to a problem in that a large amount of electric power is necessary to obtain one output code.

Further, the output code according to the above-mentioned conventional example, it is necessary that the output code be executed under the same condition in which the profile is obtained. In a case where the output code is executed under a different condition, the power consumption reduction based on the profile may not be attained.

For example, according to an output code used in a simulation in which a parallel processing is performed by a parallel computer, the output code may be executed after the length of a loop operation (loop length) or the number of executions of the loop operation has been changed. In this case, the loop length is different from that of when the profile has been obtained, and therefore the intended reduction of power consumption cannot be attained.

Also, the number of nodes (or the number of CPUs or the number of cores) for executing a parallel processing may be changed in the parallel computer. In this case, a hit rate in a second level cache memory of a CPU changes along with the variation in the number of nodes. Therefore, the operation condition of the CPU is different from that of when the profile is obtained, thereby leading to a problem in that the intended reduction of power consumption cannot be attained In view of the above-mentioned circumstances, this invention has been made, and therefore, it is an object of the invention to provide a method for reliably reducing power consumption of a computer while promoting prompt compilation of a source code and execution of an output code.

This invention provides an execution code generating method for adding a code to an execution code to be executed on a computer which includes a CPU having a power consumption reduction function, a cache memory, and a main memory, the code enabling the power consumption reduction function of the CPU, the method including the steps of: reading a code which is preset and analyzing an amount of operation of the CPU and an access amount with respect to the cache memory based on the code; obtaining an execution rate of the CPU and an access rate with respect to the cache memory based on the amount of operation and the access amount; determining an area in which the access rate with respect to the cache memory is higher than the execution rate of the CPU, based on the code; adding a code for enabling the power consumption reduction function to the area in which the access rate with respect to the cache memory is higher than the execution rate of the CPU; and generating an execution code executable on the computer, based on the code.

Further, in the execution code generating method according to this invention, the computer includes a plurality of nodes each for executing the execution code in parallel, and the step of reading a code which is preset and analyzing an amount of operation of the CPU and an access amount with respect to the cache memory based on the code includes the steps of: extracting a step of extracting a loop operation area based on the code; analyzing an amount of operation of the CPU and an access amount with respect to the cache memory for each area thus extracted; obtaining an operation loop length of the loop operation area which varies according to the times of parallel execution of the execution code; and analyzing an amount of operation of the CPU and an access amount with respect to the cache memory based on the operation loop length.

Therefore, according to this invention, it is possible to reduce the clock frequency or the operating voltage by functioning the power saving mechanism of the CPU in an area where the execution rate of memory access exceeds a predetermined value to be higher than the execution rate of the CPU, to thereby reliably minimize power consumption of the CPU.

Also, according to this invention, it is possible to generate an execution code through only one process, and the execution code thus generated is executable irrespective of a variation in the number of nodes on which the execution code is to be executed. Therefore, it is possible to obtain an execution code much quickly as compared with the above-mentioned conventional case where the compiled load module is first executed to obtain the profile and the load module is compiled again based on the profile thus obtained.

BRIEF DESCRIPTION OF THE DRAWINGS

FIG. 8 is an explanatory diagram showing an example of a data recycle table.

FIG. 9 is an explanatory diagram showing an example of a target area.

FIG. 11 is an explanatory diagram showing an example of a program corresponding to a load module to which a power consumption reduction code has been added.

DETAILED DESCRIPTION OF THE PREFERRED EMBODIMENTS

Hereinafter, embodiments of this invention will be described with reference to the accompanying drawings.

First Embodiment

Figure 1:
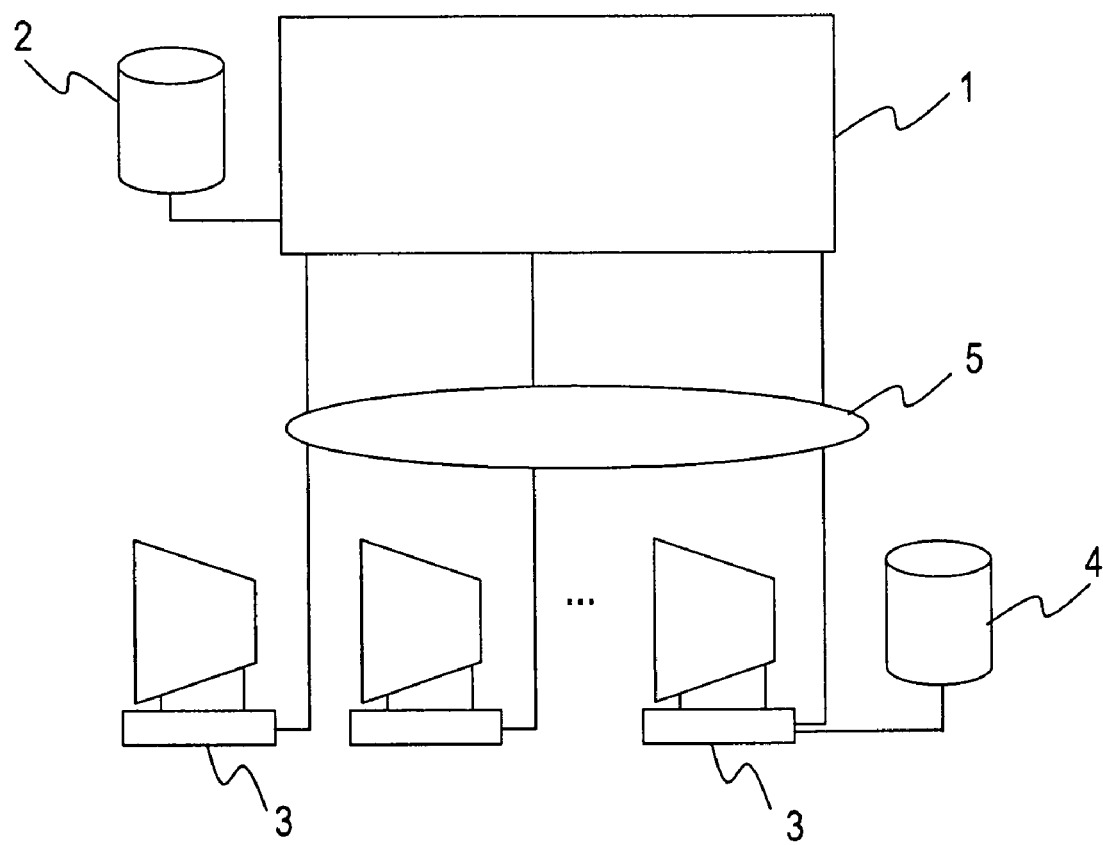
FIG. 1 is a block diagram showing a computer system according to a first embodiment.

FIG. 1 is a block diagram showing a computer system according to a first embodiment of this invention. A computer 1 for performing a parallel processing is connected to a storage system 2 which stores a source program, a load module (execution code), a compiler, or data.

The computer 1 is connected to a plurality of user terminals (clients) 3 through a network 5, so a plurality of users can use the computer 1. Each of the user terminals 3 has a storage system 4 connected thereto, in which data and a source program can be stored. The users of the user terminals 3 each can issue a command for compiling a source program to the computer 1 and execute a load module generated through the compilation to use the result of the operation.

Figure 2:
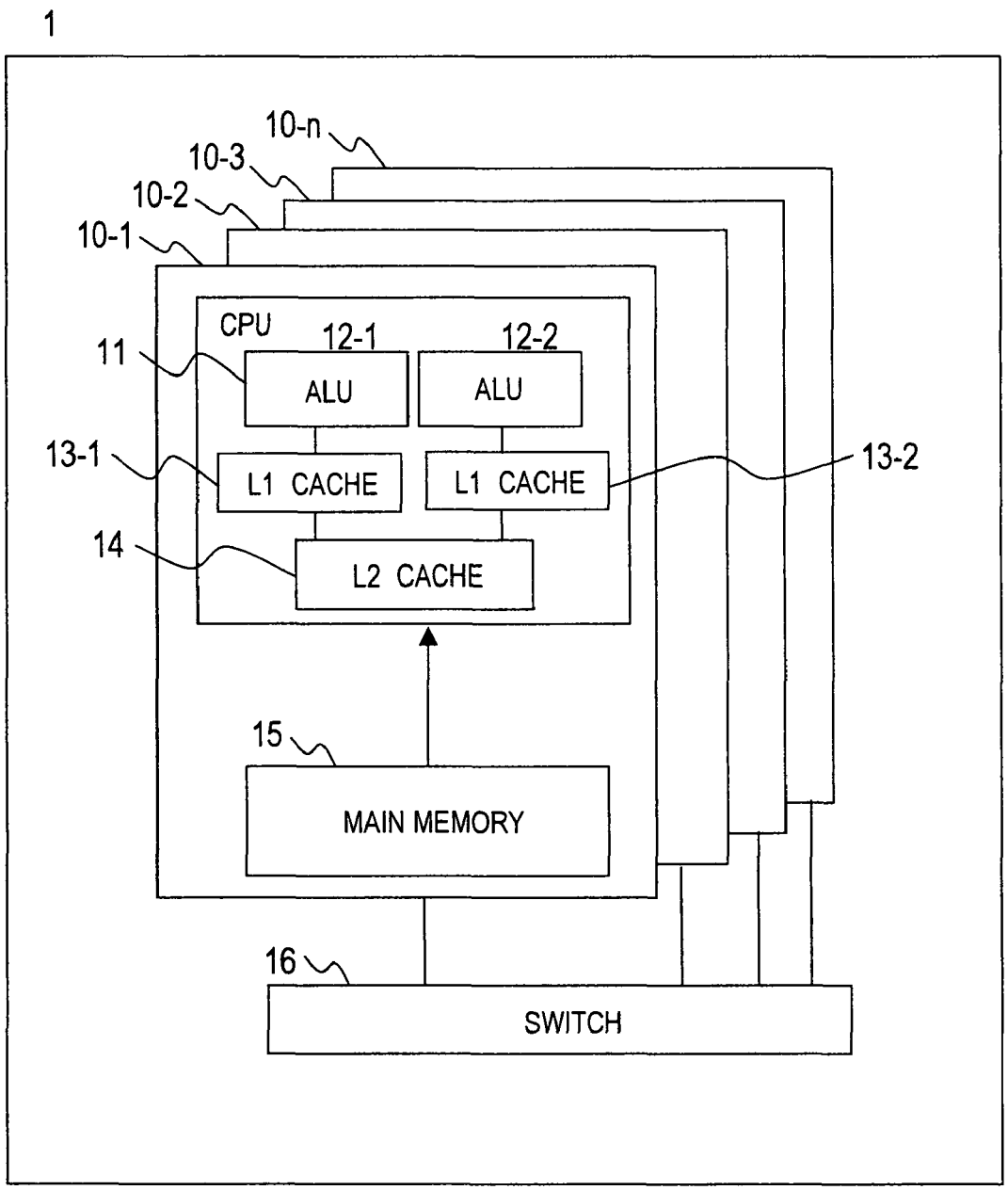
FIG. 2 is a block diagram showing a configuration of a computer.

FIG. 2 is a block diagram showing a configuration of the computer 1. The computer 1 includes a plurality of nodes 10-1 to 10-n and a switch 16 for connecting the nodes 10-1 to 10-n to one another. The switch 16 is connected to a network interface (not shown) and connects the nodes 10-1 to 10-n to the network 5. The switch 16 is also connected to a fibre channel adapter (not shown), and connects the computer 1 and the storage system 4 to each other.

The nodes 10-1 to 10-n each have a similar configuration, which includes a CPU 11 for performing an operation processing and a main memory 15 for storing data and a load module. Each of the nodes 10-1 to 10-n and the switch 16 are connected to each other through a bridge (not shown) (for example, a chip set) provided to each of the nodes 10-1 to 10-n.

The CPU 11 includes a plurality of cores in one CPU. The CPU 11 includes a plurality of ALUs (Arithmetic Logical Units) 12-1 and 12-2 each having a first level (L1) cache memories 13-1 and 13-2, respectively, and a second level cache memory 14 shared by the ALUs 12-1 and 12-2.

The ALUs 12-1 and 12-2 each temporarily store data or an execution code read from the main memory 15 into the second level cache memory 14. Then, the ALUs 12-1 and 12-2 each read information in the second level cache memory 14 necessary for executing the execution code into the first level cache memories 13-1 and 13-2 connected to each of the ALUs 12-1 and 12-2, respectively, and executes the execution code on the ALUs 12-1 and 12-2. In FIG. 2, the main memory 15 is provided to each of the nodes 10-1 to 10-n. However, the main memory 15 may include a shared memory (not shown) that is accessible from the nodes 10-1 to 10-n. The CPU may include a single core as long as a parallel processing can be performed by the nodes 10-1 to 10-n.

The CPU 11 has a power saving mechanism for changing a clock frequency (increasing or decreasing the clock frequency) or changing an operating voltage (raising and lowering the operating voltage) when a predetermined command (power consumption reduction code) is received from an OS or the like.

The computer 1 may further include a barrier synchronization mechanism (not shown) for efficiently performing a parallel processing.

Figure 3:
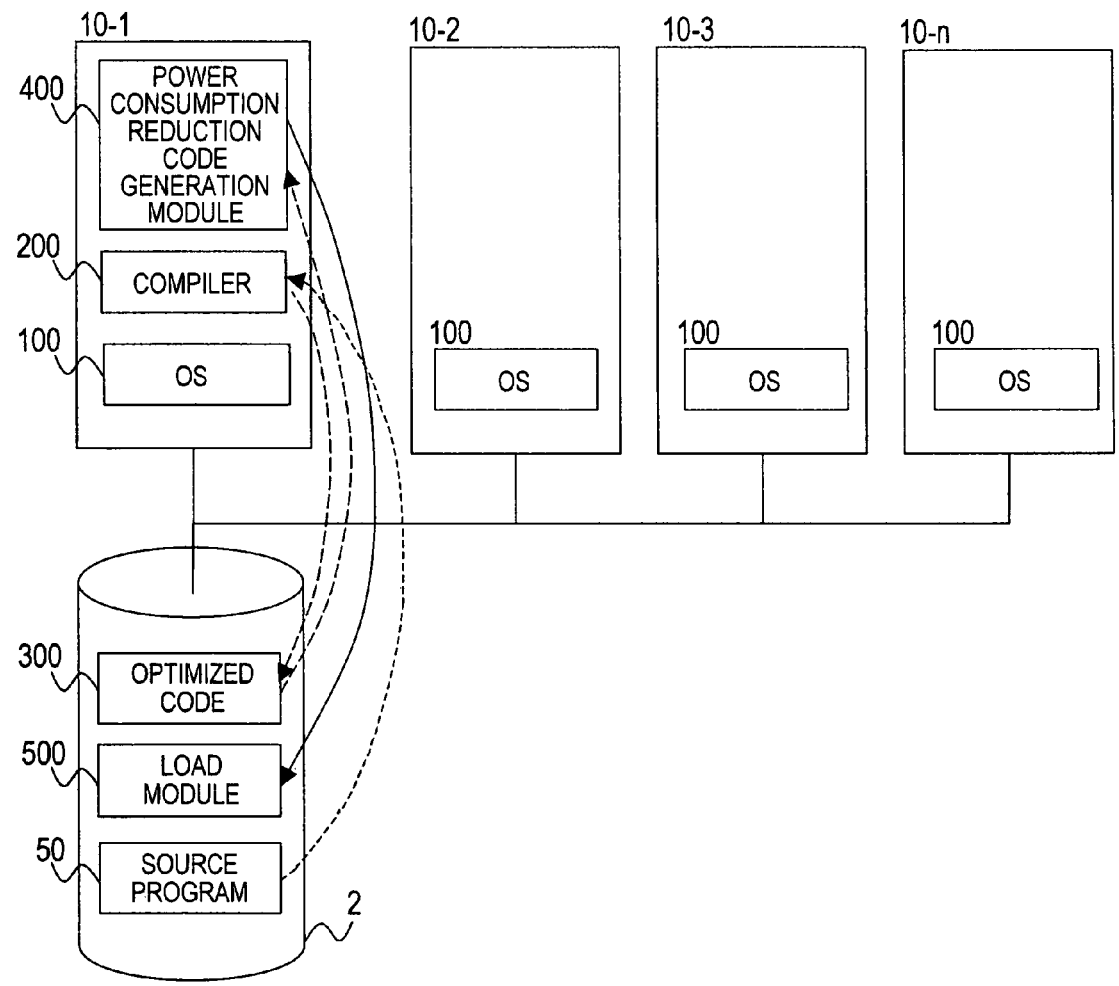
FIG. 3 is a block diagram showing the computer system, in which the source program is compiled.
Figure 4:
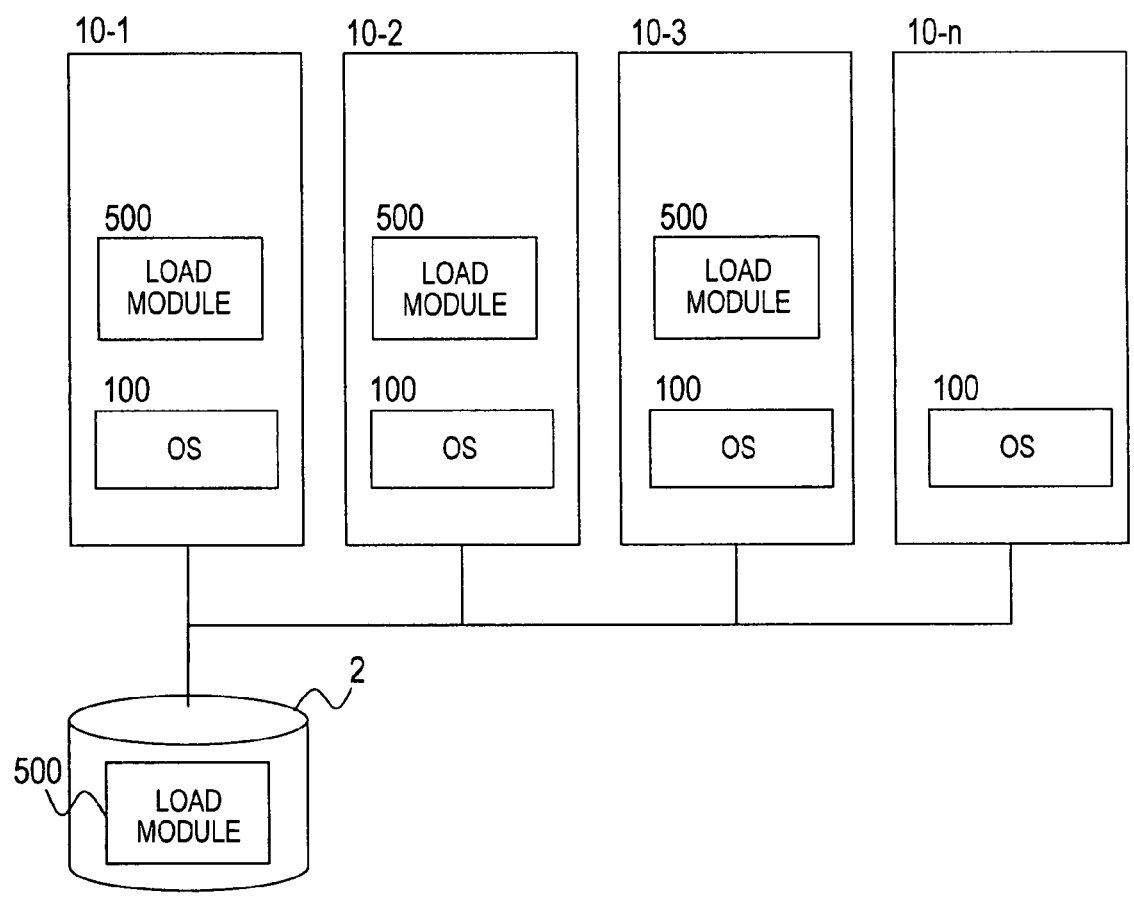
FIG. 4 is a block diagram showing the computer system, in which a load module obtained by compilation is executed.

FIGS. 3 and 4 each are a block diagram schematically showing software executed on the computer 1. FIG. 3 is a block diagram showing a case where the source program (source code) 50 is compiled, and FIG. 4 is a block diagram showing a case where a load module 500 obtained by the compilation is executed.

FIG. 3 shows an example in which compilation is performed on an arbitrary node (for example, a node 10-1) selected by the user terminal 3. An OS 100 is executed on each of the nodes 10-1 to 10-n. The node 10-1 has a compiler 200 and a power consumption reduction code generation module 400 loaded thereon. The compiler 200 outputs an optimized code 300 in response to a command from the user terminal 3. The power consumption reduction code generation module 400 analyzes the optimized code 300 to thereby control the power saving mechanism of the CPU 11.

The node 10-1 executes the compiler 200 based on a command from the user terminal 3. The compiler 200 reads, from the storage system 2, the source program 500 designated by the user terminal 3, and outputs the optimized code 300. The optimized code 300 includes, for example, an intermediate code and an object code (execution code). Then, the compiler 200 stores the optimized code 300 into the storage system 2.

Next, the power consumption reduction code generation module 400 is started on the node 10-1 based on a command from the user terminal 3. The power consumption reduction code generation module 400 reads the optimized code 300, analyzes the contents of the program so as to add, to the optimized code 300, a power consumption reduction code for controlling the power saving mechanism which shifts the clock frequency and the operating voltage (core voltage) of the CPU 11, and outputs the optimized code 300 as a load module (execution code) 500. The power consumption reduction code generation module 400 stores the load module 500 into the storage system 2.

According to this embodiment, the source program 50 performs a simulation of, for example, a scientific and technological operation. In other words, the source program 50 performs a parallel processing for executing a large amount of loop operations.

FIG. 4 shows an example in which the load module 500 generated by the compiler 200 and the power consumption reduction code generation module 400 is executed on nodes. The number of nodes is designated by the user terminal 3. In the example shown in FIG. 4, the load module 500 is read by each of the three nodes 10-1 to 10-3 to be executed thereon. The load modules 500 are executed in parallel on the nodes by reading data designated by the user terminal 3 from the storage system 2. The load module 500 outputs the simulation result of the operation to the user terminal 3 as a file.

Figure 5:
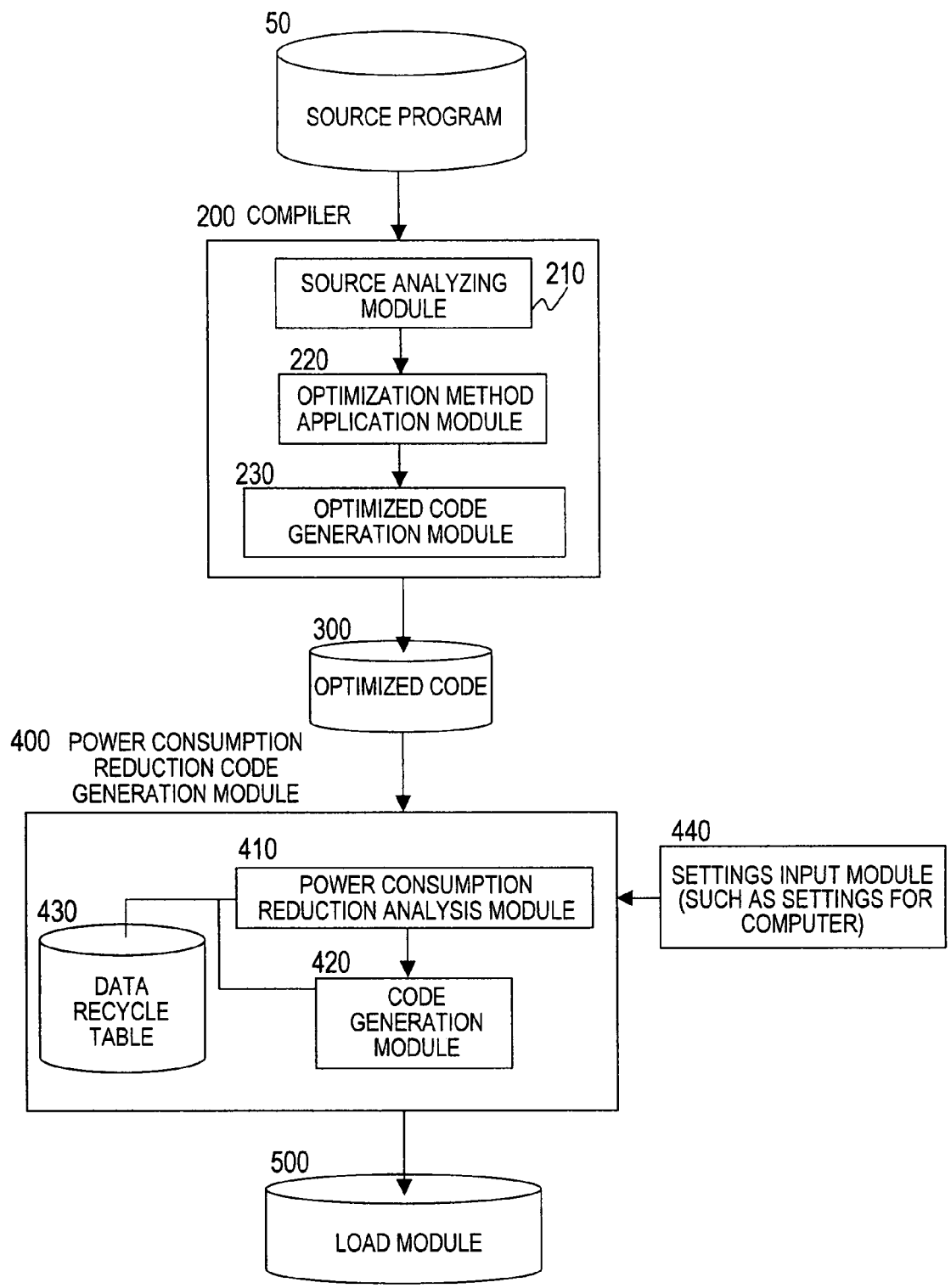
FIG. 5 is a block diagram showing an example of a configuration of a compiler and a power consumption reduction code generation module.

FIG. 5 is a block diagram showing an example of a configuration of the compiler 200 and the power consumption reduction code generation module 400.

The compiler 200 is configured similarly to a known compiler. The compiler 200 includes a source analyzing module 210, an optimization method application module 220, and an optimized code generation module 230. The source analyzing module 210 analyzes a source program 50 inputted. The optimization method application module 220 changes a statement order and an operation order of the source program 50 by a known optimization method based on the result of the analysis of the source program 50, to thereby optimizes a processing so as to be efficiently executed. The optimized code generation module 230 generates an intermediate code or an execution code that can be efficiently executed, and outputs the code thus generated.

It should be noted that the compiler 200 executes compilation based on the source program 50 and a designation or the like from the user terminal 3, without referring to the execution state (execution profile) of the load module 500 as in the above-mentioned conventional example.

The power consumption reduction code generation module 400 reads the optimized code which is an output result from the compiler 200, generates the load module 500 to which the power consumption reduction code for controlling the power saving mechanism of the CPU 11 has been added, and outputs the load module 500 thus generated.

The power consumption reduction code generation module 400 includes a power consumption reduction analysis module 410, a settings input module 440, and a code generation module 420. The power consumption reduction analysis module 410 reads the optimized code 300 to make analysis on each area (target area) for a parallel processing, creates a data recycle table 430 for each target area, and decides whether it is appropriate or not to add a power consumption reduction code based on the data recycle table 430. The settings input module 440 inputs information relating to settings (or a configuration) of the computer 1 on which the load module 500 is to be executed. The code generation module 420 generates the load module 500 to which the power consumption reduction code is added, based on the decision and the setting information described above. Further, the code generation module 420 can add a conditional branch to the load module 500, the conditional branch being used to determine whether or not to execute the power consumption reduction code depending on the size (loop length) of the target area.

Figure 6:
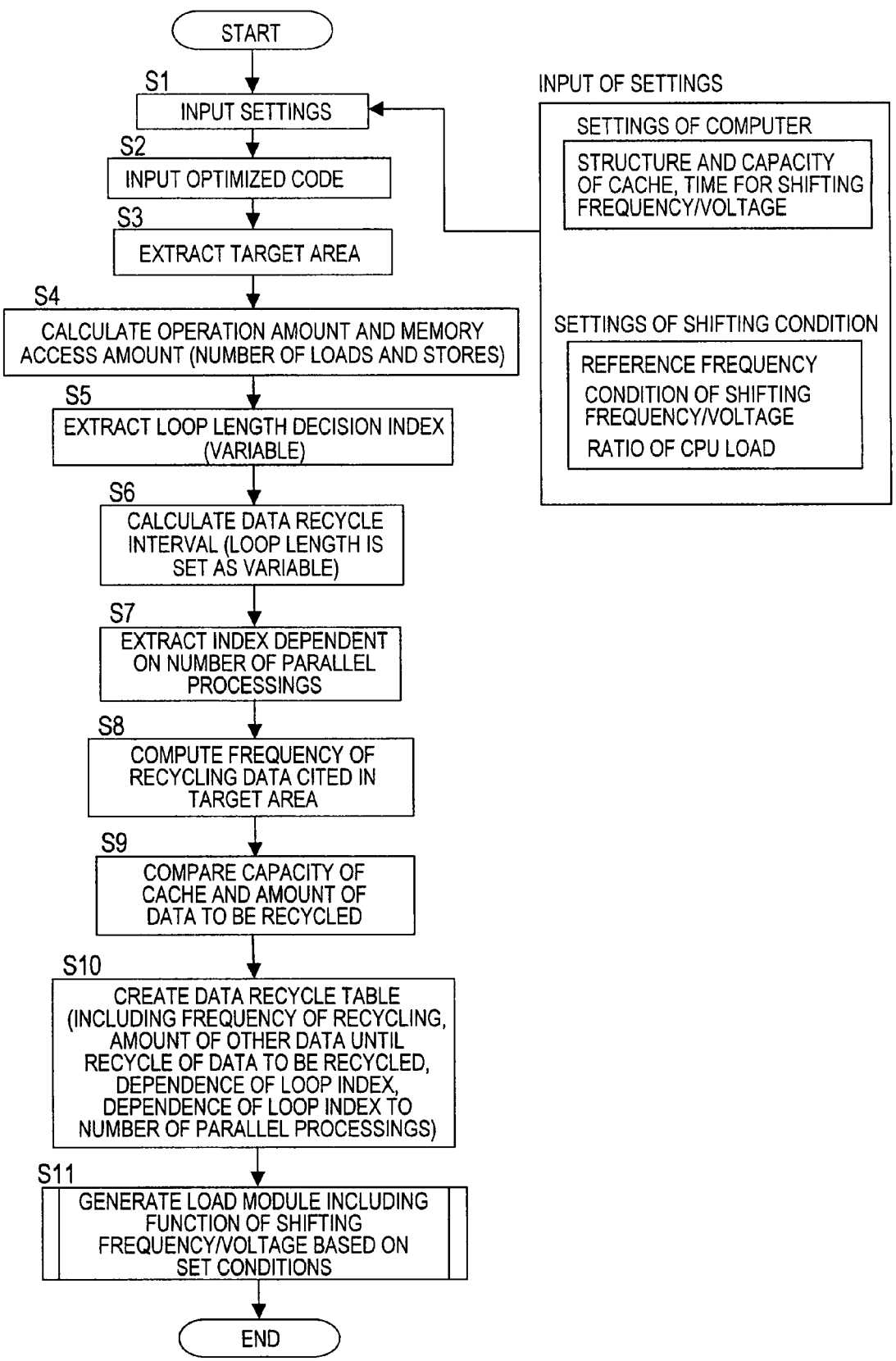
FIG. 6 is a flowchart showing an example of a processing executed on the power consumption reduction code generation module (400).

FIG. 6 is a flowchart showing an example of a processing executed on the power consumption reduction code generation module 400. The processing is executed on an arbitrary one of the nodes 10-1 to 10-n of the computer 1 based on an instruction from the user terminal 3.

First, in a step S1, information (setting information) regarding settings and a configuration of the computer 1 to be used is received from the user terminal 3. The setting information to be inputted includes a capacity of the cache (a capacity of the second level cache memory 14), a structure of the cache, time necessary for shifting a clock frequency, and time necessary for shifting an operating voltage of the computer 1. In addition, a clock frequency of the nodes 10-1 to 10-n used by the computer 1 as a reference and a shifting condition for the clock frequency and the operating voltage (a conditional branch for adding a power consumption reduction code) may also be manually set as the setting information.

Next, in s step S2, the optimized code 300 outputted from the compiler 200 is read. Then, in a step S3, the optimized code 300 is analyzed so as to extract a range corresponding to a loop operation, as a target area. After that, the target area is divided into operation areas such that data to be used by the second level cache memory 14 of the CPU 11 fits into each of the areas.

Figure 7:
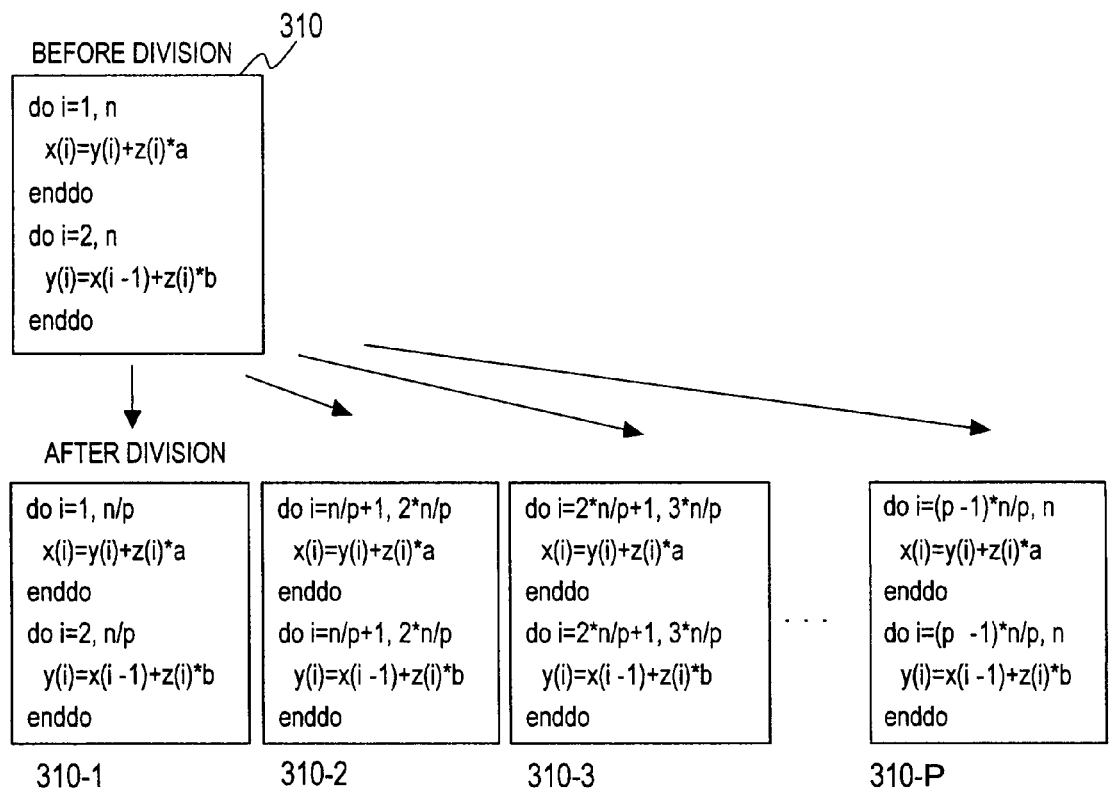
FIG. 7 is an explanatory diagram showing how a target area is divided.

For example, as shown in FIG. 7, when the optimized code 300 includes a loop operation for obtaining X(i) and a loop operation for obtaining Y(i) by using X(i), those two loop operations are extracted as a target area 310 based on data dependence. Then, the target area 310 is divided into a plurality of target areas 310-1 to 310-P based on a loop index (the number of loops) n and a parallelism index (the number of nodes) p which are designated when the load module 500 is executed. At this point in time, however, the loop index n and the parallelism index p are yet to be decided, so the loop operations are extracted as conditional expressions, accordingly. In this example, the target area 310 is divided into p target areas.

Next, in a step S4, an operation amount of the CPU 11 and an access amount with respect to the second level cache memory 14 are calculated for each of the target areas 310-1 to 310-P. In order to obtain the operation amount of the CPU 11, the number of cycles in which the computer 1 performs an operation is preset for each ALU in the target areas 310-1 to 310-P obtained through the division, and the number of cycles in each of the target areas 310-1 to 310-P are computed. For example, in the example of FIG. 7, X(i) is obtained by adding Z(i) multiplied by "a" to Y(i) (Y(i)+Z(i)×a), so cycles necessary for performing the addition and the multiplication are obtained as the number of cycles.

The access amount with respect to the memory is calculated as an access amount on, for example, byte basis based on the number of accesses (a load instruction, a prefetch instruction, or a store instruction) performed for each of the target areas 310-1 to 310-P between the main memory 15 and the second level cache memory 14, and the data amount thereof.

The above-mentioned operation amount serves as an index of a use rate (execution rate) of the CPU 11. The access amount with respect to the memory corresponds to an access rate with respect to the memory which is an index indicating time required by the second level cache memory 14 to actually perform read and write of data with respect to the main memory 15, from the capacity of the second level cache memory 14 set in the step S1.

In other words, the operation amount and the access amount with respect to the memory (or, the execution rate of the CPU 11 and the access rate with respect to the memory) are compared with each other for each of the target areas 310-1 to 310-P in processing a target area, so the power saving mechanism of the CPU 11 can be functioned as described later in a case where data necessary for the operation in the target area cannot fit into the capacity of the second level cache memory 14 and the number of readings from the main memory 15 increases, leading to a decline in the use rate of the CPU 11. On the other hand, the use rate of the CPU 11 increases when the access amount with respect to the memory is equal to or less than the capacity of the second level cache memory 14, because it is not necessary to read all the data from the main memory 15. In this case, it is not necessary to function the power saving mechanism as described later, and it is possible to enhance the speed of the parallel processing by processing the target area at a maximum clock frequency and a maximum operating voltage.

Then, in a step S5, an index for deciding a loop length (the total number of operations) is extracted from each of the target areas 310-1 to 310-P. In the example of FIG. 7, n/p, which is obtained by dividing a loop index n of the target areas 310-1 to 310-P obtained through the division by a parallelism index p which indicates the number of nodes, is extracted as a loop length deciding index. In other words, an index for obtaining the total number of loops is extracted for each of the target areas 310-1 to 310-P and assigned to a predetermined variable.

Next, in a step S6, a loop length (n/p) is obtained as an index indicating a time interval at which data on the second level cache memory 14 is recycled, and the index is assigned to a predetermined variable. In each of the target areas 310-1 to 310-P of FIG. 7 which are obtained through the division, the loop length is obtained by multiplying n/p by 2 (2×n/p).

Next, in a step S7, an index which is dependent on the number of parallel processings is extracted from each of the target areas 310-1 to 310-P. In the example of FIG. 7, a parallelism index p indicating the number of nodes on which the processing is to be executed is extracted. In a step S8, the number of recycling data read into the second level cache memory 14 is computed for each of the target areas 310-1 to 310-P. The number of recycling includes the number of variables and the number of times the data is recycled. In the example of FIG. 7, x (i−1) and z (i) have used the first data in the second loop operation, and therefore the number of recycling is obtained as "one time, two variables".

In a step S9, in order to compare the capacity of the cache memory 14 in the CPU 11 with the data amount to be recycled, the amount of data to be recycled and the amount of other data which is read into the second level cache memory 14 until the data to be recycled is recycled (the amount of the other data until the recycle of the data to be recycled) are obtained.

Stored in the data recycle table 430 in a step S10 are the number of recycle obtained in the step S8, the amount of the other data until the recycle of the data to be recycled obtained in the step S9, the operation amount obtained in the steps S4 to S7, a loop length deciding index n/p, and the parallelism index p.

In this case, the data recycle table 430 is constituted as shown in FIG. 8. The data recycle table 430 is created for each of the target areas 310-1 to 310-P. The data recycle table 430 includes, for each of the target areas obtained through the division, a name of a variable, data characteristics (continuous data or stride data), an interval at which the data is cited (the number of bytes), an interval control variable for deciding the interval at which the data is cited, the number of data recycles, an amount of other data until the recycle, the amount of other data (number of bytes), and the operation amount. The data characteristics are for deciding whether the data is continuous or in stride (discrete), which may be decided by the power consumption reduction code generation module 400 based on the data read into the second level cache memory 14 or may be set by the user terminal 3. The data is determined as stride data when one item or part of data read into a cache line of the second level cache memory 14 is used.

The contents of the data recycle table 430 of FIG. 8 are based on the contents of the target area 310' obtained through the division as shown in FIG. 9.

Next, in a step S11, the load module 500 is generated to which the power consumption reduction code is added based on the data recycle table 430 and the setting information described above.

Figure 10:
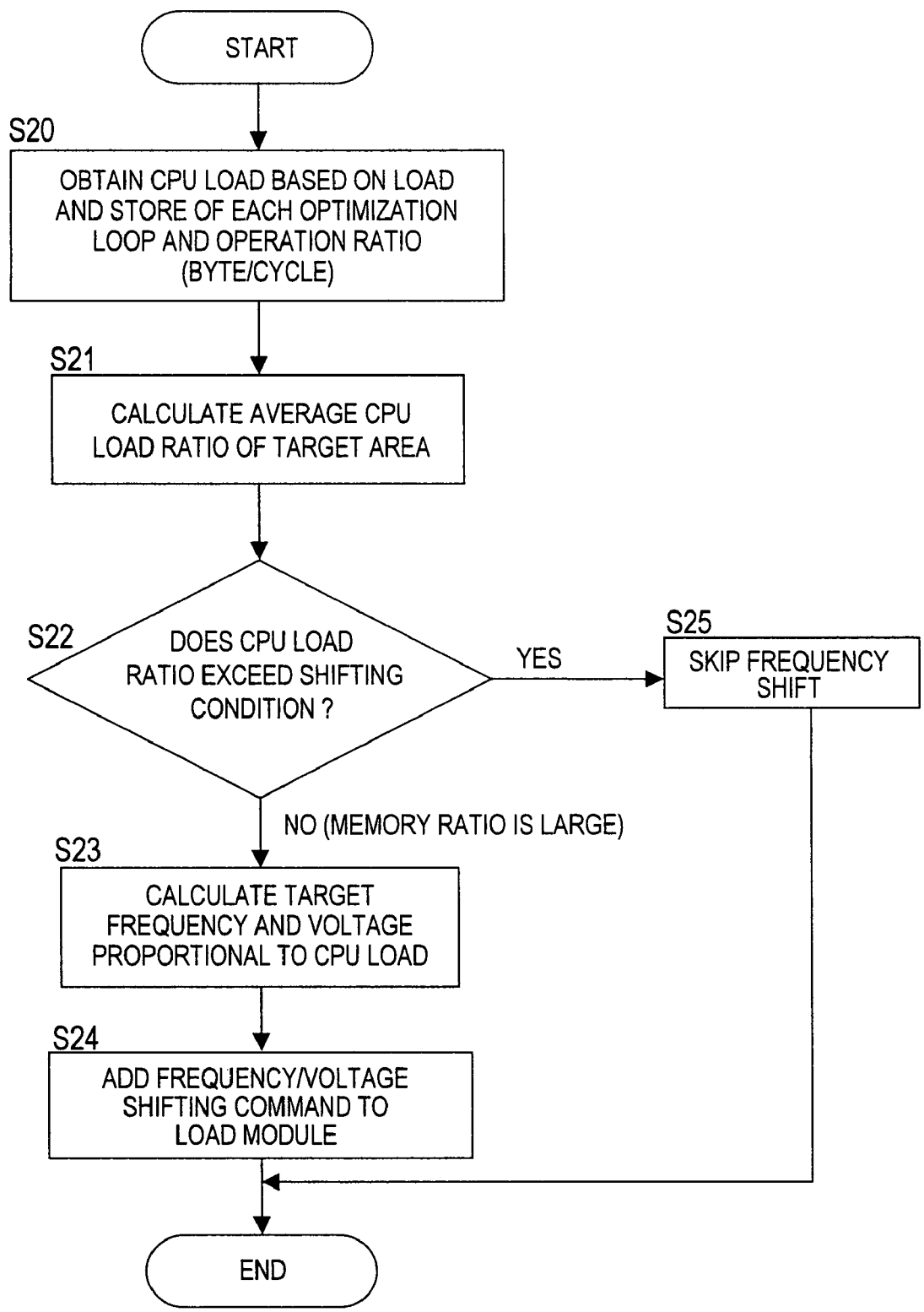
FIG. 10 is a flowchart showing a subroutine performed in the Step S11 of FIG. 6 for adding a power consumption reduction code.

FIG. 10 is a flowchart showing a subroutine performed in the step S11 for adding the power consumption reduction code. The subroutine is executed for each of the target areas 310-1 to 310-P.

First, in a step S20, a load of the CPU which is dependent on the loop length n/p of the target area is obtained based on a ratio (Byte/Cycle) between the access amount with respect to the memory and the operation amount which are obtained in the step S4. In other words, the ratio between the time for the processing of the target area to complete and the actual execution time of the CPU 11 is obtained as the execution rate of the CPU 11, the ratio between the time for the processing of the target area to complete and the time necessary for the second level cache memory 14 to transfer data is determined as an access rate with respect to the memory, and the ratio between the execution rate of the CPU 11 and the access rate with respect to the second level cache memory 14 is determined as the CPU load.

Next, in a step S21, the CPU load obtained in the step S20 with respect to each of the target areas 310-1 to 310-P is defined as an average load ratio of the CPU 11 (hereinafter, referred to as "CPU load ratio").

In the step S4, the operation amount is obtained based on the number of cycles, and the access amount with respect to the memory is obtained based on the number of bytes. Accordingly, the access amount with respect to the memory may be converted into the number of cycles, to thereby obtain the CPU load ratio by dividing the access amount with respect to the memory (the number of cycles) by the operation amount (CPU load ratio=the access amount with respect to the memory (the number of cycles)/the operation amount). To convert the access amount with respect to the memory into the number of cycles, it is only necessary to obtain time corresponding to the access amount with respect to the memory (the number of bytes) based on the transfer rate of the main memory 15 and to convert the time from the maximum clock frequency of the CPU 11 to the number of cycles.

In a step S22, the CPU load ratio is compared with a predetermined shifting condition, to thereby determine whether it is necessary or not to add the power consumption reduction code. The predetermined shifting condition is a value (e.g., 70%) set in advance to the power consumption reduction code generation module 400 or the shifting condition for the frequency and the voltage shifting which is inputted in the step S1 of FIG. 6. When the CPU load ratio exceeds the shifting condition, the ALUs 12-1 and 12-2 can be executed efficiently (without being stalled). Therefore, the processing proceeds to a step 25, in which the power consumption reduction code is not added (or the clock frequency and the operating voltage are set at maximum), and the CPU 11 is driven at the maximum clock frequency.

On the other hand, when the CPU load ratio is equal to or lower than the shifting condition in a target area, it is highly likely that the CPU 11 is stalled because it takes a long time for the memory access. Therefore, the power consumption reduction code according to the CPU load ratio is set in a step S23. In a case where the clock frequency and the operating voltage of the CPU 11 can be varied in stages, the power consumption reduction code for reducing the clock frequency and the operating voltage in stages along with the decrease of the CPU load ratio is obtained.

In a case where one instruction contains an instruction having a large cycle, such as a division instruction, the operation amount increases even when the access amount with respect to the second cache memory 14 is large, with the result that the CPU 11 is operated at the maximum clock frequency with the CPU load ratio exceeding the shifting condition. For this reason, the ratio between the operation time of the CPU 11 and the time for memory access in the target area is computed as the average CPU load ratio, so it is possible to perform the processing at high speed even in a case where the operation amount is large despite the large access amount with respect to the memory, without decreasing the clock frequency and the operating voltage.

Then, in a step S24, the power consumption reduction code obtained in the step S23 is added to the optimized code 300, and the code thus obtained is outputted as the load module 500. When the conditional branch for executing the power consumption reduction code is set in the step S1, the conditional branch for determining whether or not to execute the power consumption reduction code is added for each of the target areas 310-1 to 310-P. In a case where the optimized code 300 is an intermediate code, the intermediate code is converted into the execution code for the computer 1 in one of the steps S24 and S25, to thereby obtain the load module 500.

FIG. 11 shows an example of a program corresponding to the load module 500 to which the power consumption reduction code has been added in the step S24. The conditional branch of "if (n/p×3×B>M)" set in the step S1 is set to each of the target areas 310-1 to 310-P, and when the condition of (n/p×3×B>M) set in the conditional branch is satisfied, the power consumption reduction code (frequency reduction command A1) is executed. When the execution is completed with one of the target areas, if the set condition of the conditional branch is satisfied, the load module 500 is generated so as to execute a command A2 for getting the clock frequency back to normal. The conditional branch for executing the power consumption reduction code is executed when, for example, the loop length (n/p) is long and the data amount (B) is larger than the capacity (M) of the second level cache memory 14. In other words, when there are a large number of nodes on which the load module 500 is to be executed, the loop length of each of the target areas 310-1 to 310-P is short and the CPU load ratio increases with a decreased amount of data, which makes it unnecessary to execute the power consumption reduction code because the ALUs (computing pipelines) 12-1 and 12-2 do not stall. On the other hand, when there are a small number of nodes on which the load module 500 is to be executed, the loop length of each of the target areas 310-1 to 310-P is long and the CPU load ratio decreases with an increased amount of data, which makes it necessary to execute the power consumption reduction code because the operators (operation pipelines) 12-1 and 12-2 are likely to stall. By executing the power consumption reduction code, it is possible to reduce power consumption of the computer 1 by suppressing wasteful consumption of power in the ALUs, and also possible to prevent delay in the operation processing. Therefore, the conditional branch for determining whether or not to execute the power consumption reduction code may be provided based on the loop length for executing the load module 500.

The load module 500 generated by the processing described above is executed on a desired one of the nodes 10-1 to 10-n while setting the loop index n and the parallel processing index p to the computer 1 as shown in FIG. 4, thereby making it possible to reduce the clock frequency or the operating voltage by functioning the power saving mechanism of the CPU 11 in the target areas 310-1 to 310-P in which the access rate with respect to the memory exceeds a predetermined value to be higher than the execution rate of the CPU 11, so as to reliably reduce the power consumption in the CPU 11. When the access rate with respect to the memory is high, the ALUs 12-1 and 12-2 are likely to stall while waiting data from the main memory 15. Therefore, the execution rate of the execution code does not decrease even when the clock frequency or the operating voltage is decreased.

According to this invention, the compiler 200 and the power consumption reduction code generation module 400 can obtain the load module 500 through only one processing. Therefore, it is possible to obtain the load module 500 extremely quickly as compared with the above-mentioned conventional example in which the load module compiled is first executed to obtain a profile and the load module is compiled again based on the profile thus obtained.

Further, the number of nodes on which the load module 500 is executed can be arbitrarily set by changing the parallelism index p. Therefore, there is no need to compile again the load module which has once been compiled, thereby performing a simulation of an operation such as a scientific and technological operation with efficiency.

According to the first embodiment, the CPU 11 is formed as dual-core. However, the CPU 11 may be formed as single-core or quad-core.

Also, according to this embodiment, the power consumption reduction code generation module 400 receives an intermediate code, which makes it possible to use a conventional compiler as the compiler 200. Accordingly, it is possible to add a power consumption reduction code at low cost.

Second Embodiment

Figure 12:
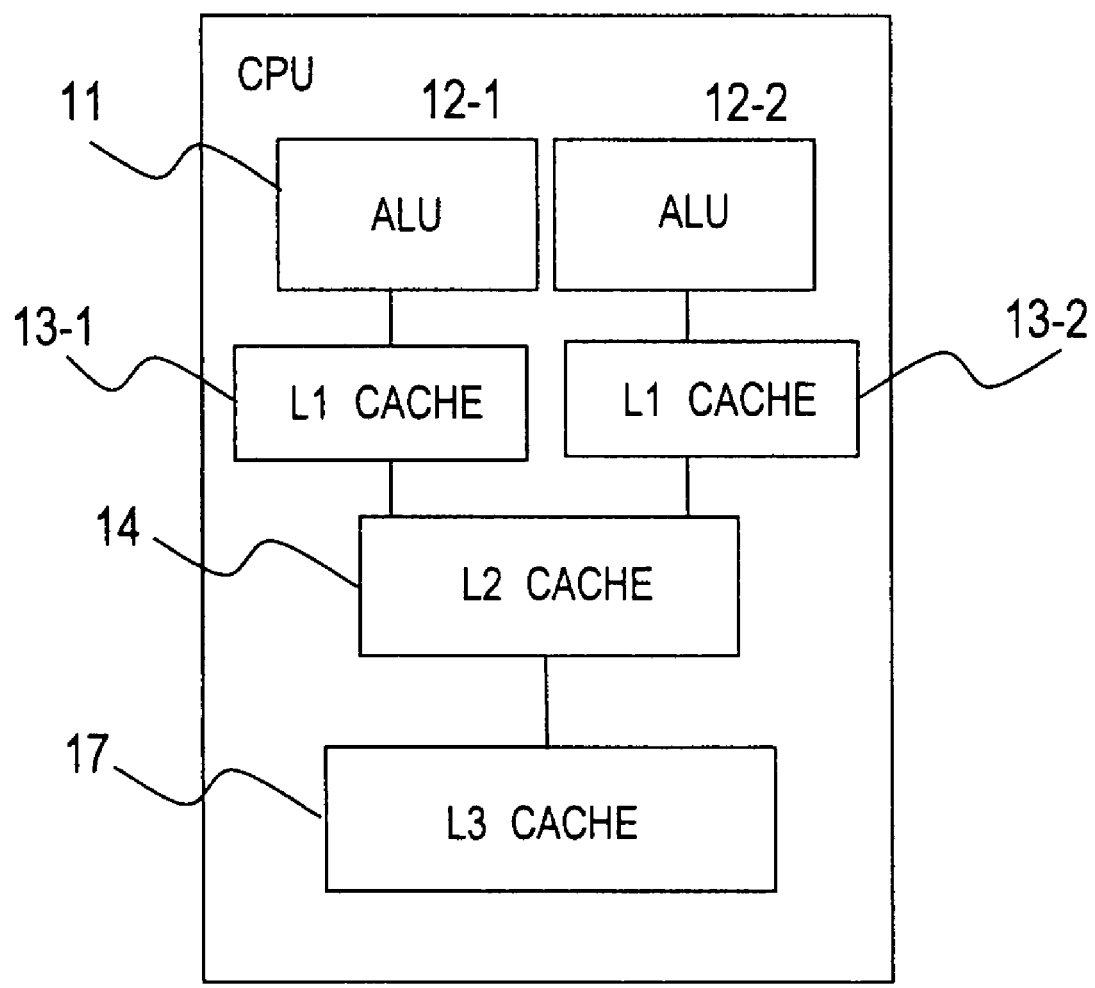
FIG. 12 is a block diagram showing a CPU according to a second embodiment.
Figure 13:
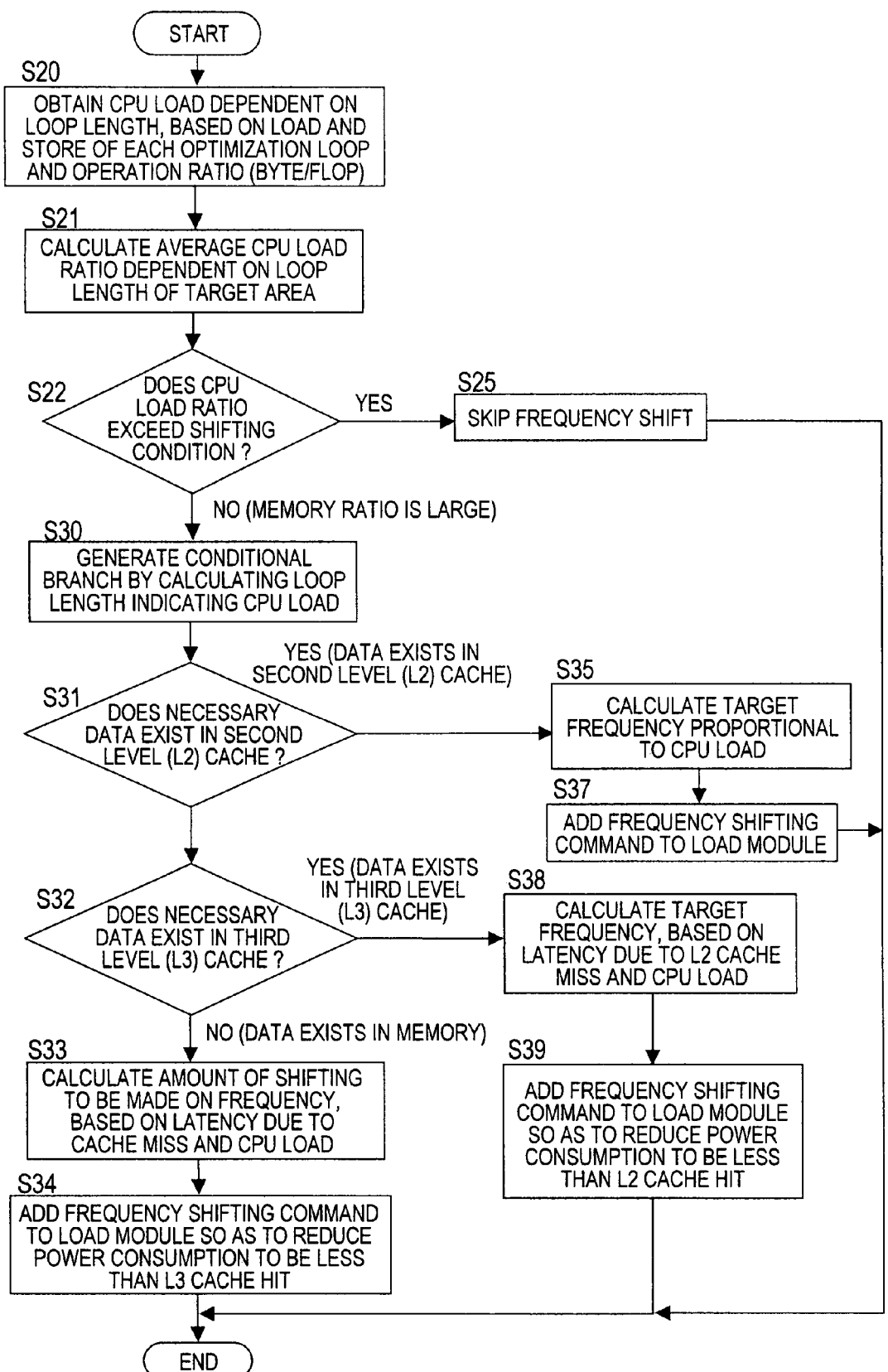
FIG. 13 is another example of a subroutine performed in Step S11 of FIG. 6 performed on the power consumption reduction code generation module (400).

FIGS. 12 and 13 each show a second embodiment, in which the CPU 11 of the first embodiment includes a third level cache memory 17.

In FIG. 12, the second level cache memory 14 of the CPU 11 includes the third level cache memory 17 on the main memory 15 side. Other configuration of the CPU 11 is similar to that of the first embodiment.

FIG. 13 shows another subroutine performed by the power consumption reduction code generation module 400 in the step S11.

In FIG. 13, the steps S20 to S22 and the step S25 are similar to those of the first embodiment of FIG. 10. Processing performed in and after a step S31 for adding a power consumption reduction code is different from that of the first embodiment.

When it is determined in the step S22 that the CPU load ratio is equal to or lower than the shifting condition, a power consumption reduction code is added in and after the step S31 because memory access time is long in the target area and the CPU 11 is highly likely to stall.

In the step S31, if data necessary for the operation in the target area is being read, it is determined whether the data to be read exists in the second level cache memory 14. When the data to be read exists in the second level cache memory 14, the processing proceeds to a step 36, in which a clock frequency and an operating voltage are calculated according to the CPU load ratio. Then, in a step S37, a power consumption reduction code corresponding to the clock frequency and the operating voltage determined in the step S36 is added.

On the other hand, if the data to be read does not exist in the second level cache memory 14, the processing proceeds to a step S32.

In the step S32, if data necessary for the operation in the target area is being read, it is determined whether the data to be read exists in the third level cache memory 17. When the data to be read exists in the third level cache memory 17, the processing proceeds to a step S38 in which a clock frequency and an operating voltage are calculated according to a latency due to the cache miss in the second level cache memory 14 and the CPU load ratio. Then, in a step S39, a power consumption reduction code corresponding to the operating code and the operating voltage, which are determined in the step S38 is added.

When it is determined in the step S32 that the data to be read does not exist in the third level cache memory 17 either, the processing proceeds to a step S33.

In the step S33, a clock frequency and an operating voltage are calculated according to latency due to the cache miss in the third level cache memory 17 (the latency for reading the data from the main memory 15) and the CPU load ratio. Then, in a step S34, a power consumption reduction code corresponding to the clock frequency and the operating voltage, which are determined in the step S33 is added.

In this manner, in a case where the CPU 11 includes the second level cache memory 14 and the third level cache memory 17, the clock frequency and the operating voltage may be varied by changing a latency depending on where the data exists with respect to the position where a cache miss has occurred. The latency may be preset based on the data transfer rate of the main memory 15 or the third level cache memory 17.

In this embodiment, the third level cache memory 17 is provided on the main memory 15 side, but may be provided on a back-side bus (not shown).

Third Embodiment

Figure 14:
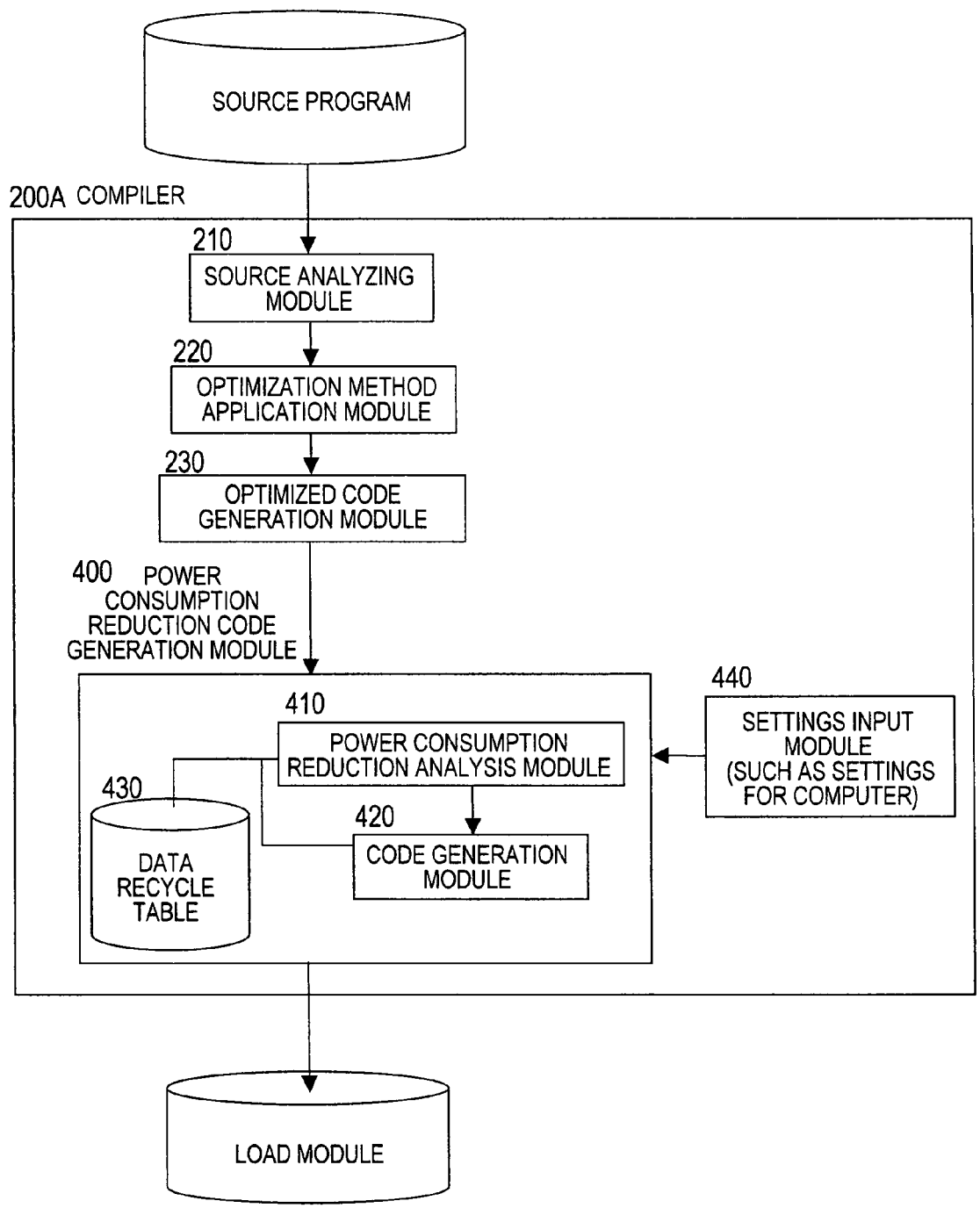
FIG. 14 is a block diagram of a compiler according to a third embodiment.

FIG. 14 shows a third embodiment, in which the power consumption reduction code generation module 400 of the first embodiment is incorporated into a compiler. Other configuration of the third embodiment is similar to that of the first embodiment.

An optimized code generation module 230 of a compiler 200A outputs an optimized code to the power consumption reduction code generation module 400. The power consumption reduction code generation module 400 analyzes the optimized code and outputs the load module 500 to which a power consumption reduction code has been added as in the first embodiment.

In this example, it is not necessary to output an intermediate code, which makes it possible to obtain the load module 500 even more quickly.

It should be noted that in the first to third embodiments, the loop operation is selected as the target area to which the power consumption reduction code is to be added, from the area in which the optimized code which has been read is operated. However, the target area is not limited to the loop operation, and may be applied to a subroutine or the like as long as the target area has a preset program structure.

As described above, according to this invention, it is possible to add a power consumption reduction code to a load module suitable for a parallel processing through one-time compilation and an execution of the power consumption reduction code generation module. Therefore, this invention can be applied to a compiler suitable for a parallel processing or to a load module generation program.

While the present invention has been described in detail and pictorially in the accompanying drawings, the present invention is not limited to such detail but covers various obvious modifications and equivalent arrangements, which fall within the purview of the appended claims.

What is claimed is:

1. An execution code generating method for adding a code to an execution code to be executed on a computer which includes a CPU having a power consumption reduction function, a cache memory, and a main memory, the code enabling the power consumption reduction function of the CPU, the method comprising the steps of:

reading a code which is preset and analyzing an amount of operation of the CPU and an access amount with respect to the cache memory based on the code;

obtaining an execution rate of the CPU and an access rate with respect to the cache memory based on the amount of operation and the access amount;

determining an area in which the access rate with respect to the cache memory is higher than the execution rate of the CPU, based on the code;

adding a code for enabling the power consumption reduction function to the area in which the access rate with respect to the cache memory is higher than the execution rate of the CPU; and generating an execution code executable on the computer, based on the code.

2. The execution code generating method according to claim 1, wherein the step of adding a code for enabling the power consumption reduction function comprises the steps of:
   determining one of a clock frequency and an operating voltage of the CPU in proportion to a load of the CPU; and
   adding a code for setting one of the clock frequency and the operating voltage thus determined.

3. The execution code generating method according to claim 1, wherein the step of reading a code which is preset and analyzing an amount of operation of the CPU and an access amount with respect to the cache memory based on the code comprises the step of reading an intermediate code which is preset and analyzing the amount of operation of the CPU and the access amount with respect to the cache memory based on the intermediate code.

4. The execution code generating method according to claim 1, wherein the step of reading a code which is preset and analyzing an amount of operation of the CPU and an access amount with respect to the cache memory based on the code further comprises the steps of:
   reading a source code which is preset and generating an optimized intermediate code based on the source code; and
   analyzing the amount of operation of the CPU and the access amount with respect to the cache memory based on the optimized intermediate code.

5. The execution code generating method according to claim 1, wherein the step of reading a code which is preset and analyzing an amount of operation of the CPU and an access amount with respect to the cache memory based on the code further comprises the steps of:
   dividing an operation area which is preset, based on the code; and
   analyzing an amount of operation of the CPU and an access amount with respect to the cache memory for each area obtained through the division.

6. The execution code generating method according to claim 5, wherein the step of dividing an operation area which is preset, based on the code, further comprises the steps of:
   extracting a loop operation area based on the code; and
   analyzing an amount of operation of the CPU and an access amount with respect to the cache memory for each loop operation area thus extracted.

7. The execution code generating method, according to claim 1, wherein:
   the computer comprises a plurality of nodes each for executing the execution code in parallel; and
   the step of reading a code which is preset and analyzing an amount of operation of the CPU and an access amount with respect to the cache memory based on the code further comprises the steps of:
      extracting a step of extracting a loop operation area based on the code;
      analyzing an amount of operation of the CPU and an access amount with respect to the cache memory for each area thus extracted;
      obtaining an operation loop length of the loop operation area which varies according to times of parallel execution of the execution code; and
      analyzing an amount of operation of the CPU and an access amount with respect to the cache memory based on the operation loop length.

8. The execution code generating method according to claim 7, wherein the step of adding a code for enabling the power consumption reduction function further comprises the step of adding a conditional branch instruction for determining whether or not to execute the code for enabling the power consumption reduction function based on the operating loop length, when executing the execution code.

9. The execution code generating method according to claim 1, further comprising the step of setting a capacity of the cache memory of the computer, wherein the step of reading a code which is preset and analyzing an amount of operation of the CPU and an access amount with respect to the cache memory based on the code further comprises the step of computing the access amount with respect to the cache memory from an amount of data transferred between the cache memory and the main memory, based on the capacity of the cache memory.

10. A computer readable storage medium containing a program executable by a computer for adding a code to an execution code to be executed on a computer which includes a CPU having a power consumption reduction function, a cache memory, and a main memory, the code enabling the power consumption reduction function of the CPU, the program controlling the computer to:
    perform a process of reading a code which is preset and analyzing an amount of operation of the CPU and an access amount with respect to the cache memory based on the code;
    perform a process of obtaining an execution rate of the CPU and an access rate with respect to the cache memory based on the amount of operation and the access amount;
    perform a process of determining an area in which the access rate with respect to the cache memory is higher than the execution rate of the CPU, based on the code;
    perform a process of adding a code for enabling the power consumption reduction function to the area in which the access rate with respect to the cache memory is higher than the execution rate of the CPU; and
    perform a process of generating an execution code executable on the computer, based on the code.

11. The computer readable storage medium according to claim 10, wherein the process of adding a code for enabling the power consumption reduction function comprises the processes of:
    deciding one of a clock frequency and an operating voltage of the CPU in proportion to a load of the CPU; and
    adding a code for setting one of the clock frequency and the operating voltage thus decided.

12. The computer readable storage medium according to claim 10, wherein the process of reading a code which is preset and analyzing an amount of operation of the CPU and an access amount with respect to the cache memory based on the code comprises the process of reading an intermediate code which is preset and analyzing the amount of operation of the CPU and the access amount with respect to the cache memory based on the intermediate code.

13. The computer readable storage medium according to claim 10, wherein the process of reading a code which is preset and analyzing an amount of operation of the CPU and an access amount with respect to the cache memory based on the code further comprises the processes of:
    reading a source code which is preset and generating an optimized intermediate code based on the source code; and
    analyzing the amount of operation of the CPU and the access amount with respect to the cache memory based on the optimized intermediate code.

14. The computer readable storage medium according to claim 10, wherein the process of reading a code which is preset and analyzing an amount of operation of the CPU and an access amount with respect to the cache memory based on the code further comprises the processes of:

dividing an operation area which is preset, based on the code; and analyzing an amount of operation of the CPU and an access amount with respect to the cache memory for each area obtained through the division.

15. The computer readable storage medium according to claim 14, wherein the process of dividing an operation area which is preset, based on the code, further comprises the processes of:

extracting a loop operation area based on the code; and analyzing an amount of operation of the CPU and an access amount with respect to the cache memory for each loop operation area thus extracted.

16. The computer readable storage medium according to claim 10, wherein:

the computer comprises a plurality of nodes each for executing the execution code in parallel;

the process of reading a code which is preset and analyzing an amount of operation of the CPU and an access amount with respect to the cache memory based on the code further comprises the processes of:

extracting a process of extracting a loop operation area based on the code;

analyzing an amount of operation of the CPU and an access amount with respect to the cache memory for each loop operation area thus extracted;

obtaining an operation loop length of the loop operation area which varies according to times of parallel execution of the execution code; and analyzing an amount of operation of the CPU and an access amount with respect to the cache memory based on the operation loop length.

17. The computer readable storage medium according to claim 16, wherein the process of adding a code for enabling the power consumption reduction function further comprises the process of adding a conditional branch instruction for determining whether or not to execute a code for enabling the power consumption reduction function based on the operating loop length, when executing the execution code.

18. The computer readable storage medium according to claim 10, further comprising the process of setting a capacity of the cache memory of the computer, wherein the process of reading a code which is preset and analyzing an amount of operation of the CPU and an access amount with respect to the cache memory based on the code further comprises the process of computing the access amount with respect to the cache memory from an amount of data transferred between the cache memory and the main memory, based on the capacity of the cache memory.

* * * * *